US007035927B2

(12) United States Patent
Flockhart et al.

(10) Patent No.: US 7,035,927 B2
(45) Date of Patent: Apr. 25, 2006

(54) INTELLIGENT INBOUND/OUTBOUND COMMUNICATIONS BLENDING

(75) Inventors: Andrew Derek Flockhart, Thornton, CO (US); Robin H. Foster, Little Silver, NJ (US); Eugene P. Mathews, Barrington, IL (US); Darryl J. Maxwell, Lafayette, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 723 days.

(21) Appl. No.: 10/097,017

(22) Filed: Mar. 12, 2002

(65) Prior Publication Data

US 2003/0177231 A1 Sep. 18, 2003

(51) Int. Cl.
*H04M 3/36* (2006.01)
*G06F 15/173* (2006.01)

(52) U.S. Cl. .................. 709/225; 379/265; 718/100

(58) Field of Classification Search ................ 709/225; 379/265.01, 265; 718/100
See application file for complete search history.

(56) References Cited

U.S. PATENT DOCUMENTS

| 5,586,179 A | | 12/1996 | Stent et al. |
|---|---|---|---|
| 5,721,770 A | * | 2/1998 | Kohler .................. 379/265.12 |
| 5,815,566 A | | 9/1998 | Ramot et al. |

FOREIGN PATENT DOCUMENTS

| EP | 0460816 A2 | 12/1991 |
|---|---|---|
| WO | 94/09585 | 4/1994 |

OTHER PUBLICATIONS

Dummas, G. et al., "Improving Efficiency of PBX-Based Call Centers: Combining Inbound and Outbound Agents With Automatic Call Sharing" ISS '95, Apr. 1995, vol. 1, pp. 346-350.

* cited by examiner

*Primary Examiner*—Kamini Shah
(74) *Attorney, Agent, or Firm*—David Volejnicek

(57) ABSTRACT

In a blended inbound/outbound call center (100), an outbound call-pacing function (122) decides whether or not to initiate an additional outbound call for a particular skill. It determines (206) whether the number of available agents for the skill plus the number of resting agents for the skill exceeds the number of available inbound calls for the skill plus the number of outstanding outbound calls for the skill. It also determines (312) whether a target service time for the skill exceeds an estimated wait time of each of the available inbound calls for the skill assuming that pending outbound calls for the skill plus one take precedence over the inbound calls. If both determinations are affirmative, the call pacing function initiates (318) an additional call for the skill. If either determination is negative, the function forbears (321) from initiating an additional call for the skill. The number of available and resting agents may be incremented (206) by (a) a difference between the target service time for the skill and the present waiting time of the last-enqueued inbound call for the skill divided by the average rate of advance through the skill's call queue, or (b) the average amount of time that a newly-initiated outbound call for the skill takes to become available divided by the average rate of advance, plus the number of agents for the skill who are busy but expected to become available within a time period equal to (a) or (b), less the number of those agents that will receive a rest period upon becoming idle. The number of calls may be incremented (206) by the number of inbound calls that are expected to arrive within the time period (a) or (b).

17 Claims, 4 Drawing Sheets

INTELLIGENT INBOUND/OUTBOUND COMMUNICATIONS BLENDING

TECHNICAL FIELD

This invention relates to real-time work centers in general and to call centers in particular.

BACKGROUND OF THE INVENTION

An inbound call center serves a varying load of calls and often has agent time available in excess of that which is needed to provide a desired level of service to inbound (incoming) calls. A way of maintaining a steady and productive use of the agent population in the call center is to blend (interleave) outbound (outgoing) calls with inbound calls. When the inbound call load is heavy, few or no outbound calls are placed. When the inbound call load is light, the number of outbound calls is increased to maintain a steady workload for the agents.

It has become the practice to monitor various factors of the inbound call workload and inbound workforce to determine how many outbound calls and of what type can be launched for servicing by "blended" inbound/outbound agents. These factors include the number of available agents and the skills which each supports, how long each busy agent has been servicing a call so far, and how likely an outbound call is to be answered by the call recipient. The prior art uses predictive pacing algorithms for outbound calls to keep a steady flow of outbound calls in time for the anticipated availability of agents in the near future. These systems predict the rate at which outbound calls can be serviced based on the expected rate at which agents will become free to handle them. However there are factors, such as when precisely each agent will complete their current call and become available for new work, that are not in the control of the system and are difficult to predict. This makes these predictive algorithms prone to error. In some cases, the recipient will answer an outbound call, but no agent will be available to service it. In other cases, agents will become available, but no outbound calls will have been answered and made available for servicing. Error adversely affects the operation of the call center: Too many answered calls lead either to delay in connecting the answering party to an agent or to too few agents being available to handle the inbound calls, while too few calls launched or answered yields idle agents and lower agent productivity.

SUMMARY OF THE INVENTION

This invention is directed to solving these and other problems and disadvantages of the prior art. According to the invention, a method of determining whether or not to initiate an additional task (e.g., an additional outbound call) comprises the following steps. A determination is made of whether a number of resources (e.g., idle agents) for processing tasks (e.g., calls) exceeds a number of the tasks (e.g., unprocessed calls). A determination is also made of whether a target time (e.g., a maximum time for starting to service an available inbound call) of each of the tasks plus the additional task exceeds an estimated wait time for one of the resources. Illustratively, the additional task takes priority over at least some of the tasks (e.g., over available inbound calls). In response to determining both that the number of the resources exceeds the number of the tasks and that the target time exceeds an estimated wait time of each of the tasks plus the additional task, the additional task is initiated. But in response to determining either that the number of the resources does not exceed the number of the tasks or that the target time does not exceed the estimated wait time of each of the tasks plus the additional task, the additional task is not initiated.

Illustratively according to the invention, a determination of whether or not to initiate an outbound call in a blended inbound/outbound call center is made as follows. A determination is made of whether a first number comprising a number of agents having a skill who are available for servicing calls plus a number of agents having the skill who are resting exceeds a second number comprising a number of inbound calls needing the skill that are available for servicing plus a number of outstanding outbound calls needing the skill. A determination is also made of whether a target maximum amount of time for commencing to service each available inbound call needing the skill exceeds an estimated wait time for an agent having the skill of each of the available inbound calls needing the skill and of an additional outbound call needing the skill, wherein the outbound calls needing the skill take precedence over the inbound calls needing the skill. In response to determining both that the first number exceeds the second number and that the target time exceeds the estimated wait time of each of the available inbound calls needing the skill and of the additional outbound call needing the skill, the additional outbound call needing the skill is initiated. But in response to determining either that the first number does not exceed the second number or that the target time does not exceed the estimated wait time of each of the available inbound calls needing the skill and of the additional outbound call needing the skill, the additional outbound call needing the skill is not initiated.

The invention significantly improves pacing of additional tasks for resources. It primarily provides advantage to the blending of two types of work—such as inbound and outbound calls—where both types have real-time dynamics, because this is where mistakes have consequences for other real-time demands and therefore avoidance of mistakes is important.

While the invention has been characterized in terms of a method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

These and other features and advantages of the invention will become apparent from the following description of an illustrative embodiment of the invention considered together with the drawing.

DETAILED DESCRIPTION OF AN ILLUSTRATIVE EMBODIMENT

Reference will now be made in detail to the illustrative embodiment of the invention, which is illustrated in the accompanying drawing. While the invention will be described in conjunction with the illustrative embodiment, it will be understood that it is not intended to limit the invention to this embodiment. On the contrary, the invention is intended to cover alternatives, modifications, and equivalents, which may be included within the invention as defined by the appended claims.

Figure 1:
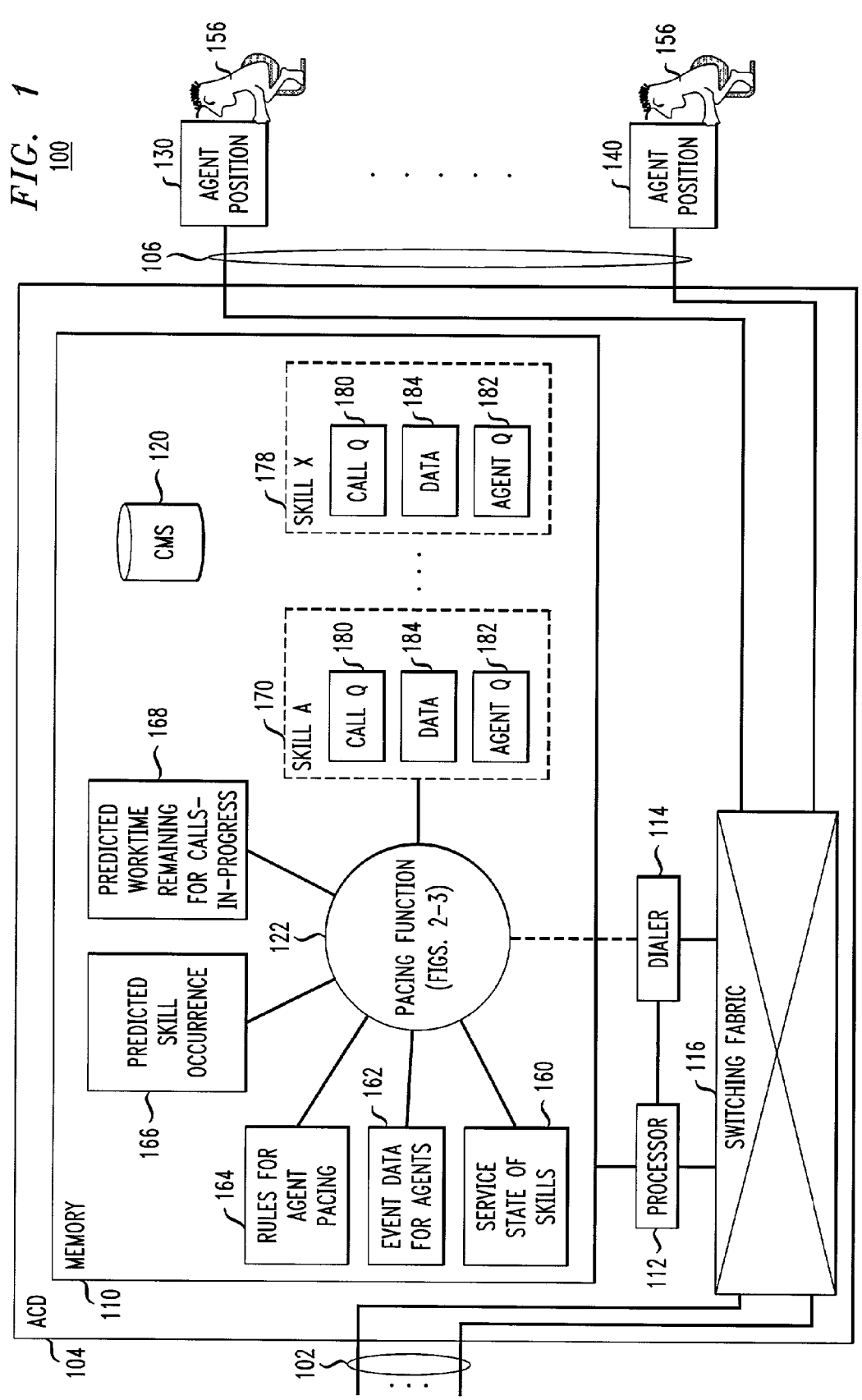
FIG. 1 is a block diagram of a call center that includes an illustrative embodiment of the invention.

FIG. 1 shows an illustrative call center 100 for servicing inbound and outbound calls. The word "call" is used herein generically to mean any communication or request for expeditious service. Call center 100 comprises an automatic call distributor (ACD) 104 that interconnects agent positions 130–140 via calls with the outside world to which it is connected by communications trunks 102. ACD 104 includes a switching fabric 116 that selectively interconnects trunks 102 with communications lines 106 that extend to agent positions 130–140. Each agent position 130–140 includes a terminal, such as a personal computer, and a voice communications device, such as a telephone or a headset, for use by an agent 156. ACD 104 is a stored program-controlled apparatus that operates under control of a processor 112 that obtains data from and stores data in, and executes stored programs out of, a memory 110 or any other computer-readable medium. Data in memory 110 include historical and operational data of ACD 104 and agents 156, which are stored in a call management system (CMS) 120 database. Processor 112 controls operation of switching fabric 116 and of a dialer 114 that generates outgoing calls on trunks 102 through switching fabric 116.

In determining how many and what type of outbound calls dialer 114 should place, an outbound pacing algorithm conventionally has knowledge of: how many agents 156 are available and what skills each supports, how long each busy agent 156 has been servicing a call so far, and how likely the outbound calls are to be answered. It is important to get the "right" number of outbound calls launched. On one hand, too many answered calls will lead either to delays in connecting the answering parties to agents 156 or to too few agents being left to handle the normal volume of inbound calls. On the other hand, too few launched or answered calls will lead to agent productivity being lower than it could have been.

As described so far, call center 100 is conventional.

For purposes of the following discussion, a call, whether incoming or outgoing, represents a task to be served, and an agent position 130-140 that is presently staffed by an agent 156 represents a resource for serving tasks.

According to the invention, memory 110 of ACD 104 includes an outbound call-pacing function 122. Pacing function 122 governs how many and which type of outbound calls to place. Pacing function 122 incorporates the following information into the outbound call-pacing algorithm: service state of skills 160, event data for agents 162, rules for agent pacing 164, predicted skill occurrence 166, and predicted worktime remaining for calls in-progress 168. Service state of skills 160 defines the service state of the skills or splits that exist in call center 100, illustratively as described in U.S. patent application Ser. No. 09/461,902, filed on Dec. 15, 1999, which is hereby incorporated herein by reference. This information enables pacing function 122 to ensure that it will not draw agents 156 away from skills that are in an under-serviced state, and conversely enables it to know which skills are in an over-serviced state and whose agents consequently may be drawn away. Event data for agents 162 indicates the variable periods of rest that are provided between calls to agents 156 who are presently governed by agent pacing, illustratively as described in U.S. patent application Ser. No. 09/461,904, filed on Dec. 15, 1999, which is hereby incorporated herein by reference. This data provides pacing function 122 with knowledge of when each of these agents 156 will next become available, so that, for example, an outbound call can be launched to coincide with the availability of such an agent 156. Rules for agent pacing 164 provides pacing function 122 with knowledge of the rules that are used to pace the work of agents 156 who are presently governed by agent pacing, illustratively as described in the abovementioned U.S. patent application Ser. No. 09/461,904. This data provides pacing function 122 with the ability to predict which of those agents 156 who are presently busy servicing calls are likely to receive a rest period after becoming available and what the length of that rest period is likely to be. Predicted skill occurrence predicts the availability of agents 156 with particular skills, illustratively as described in U.S. Pat. No. 5,506,898. The weighted advance time (WAT) described therein is the rate at which calls are advancing in queue, which is equal to the rate at which agents with the appropriate skill become available to service calls from this queue. This information provides pacing function 122 with knowledge of the predicted time between instances of such agents 156 with a particular skill becoming available. Predicted worktime remaining for calls-in-progress 158 provides a prediction of the amount of worktime remaining for each call that is presently being served, defined from either the present point or the most-recent milestone passed in the servicing of the call, illustratively as described in U.S. patent application Ser. No. 09/333,215, filed on Jun. 15, 1999, which is hereby incorporated herein by reference. This information provides pacing function 122 with knowledge of when a next presently-busy agent 156 will likely become available.

Figure 2:
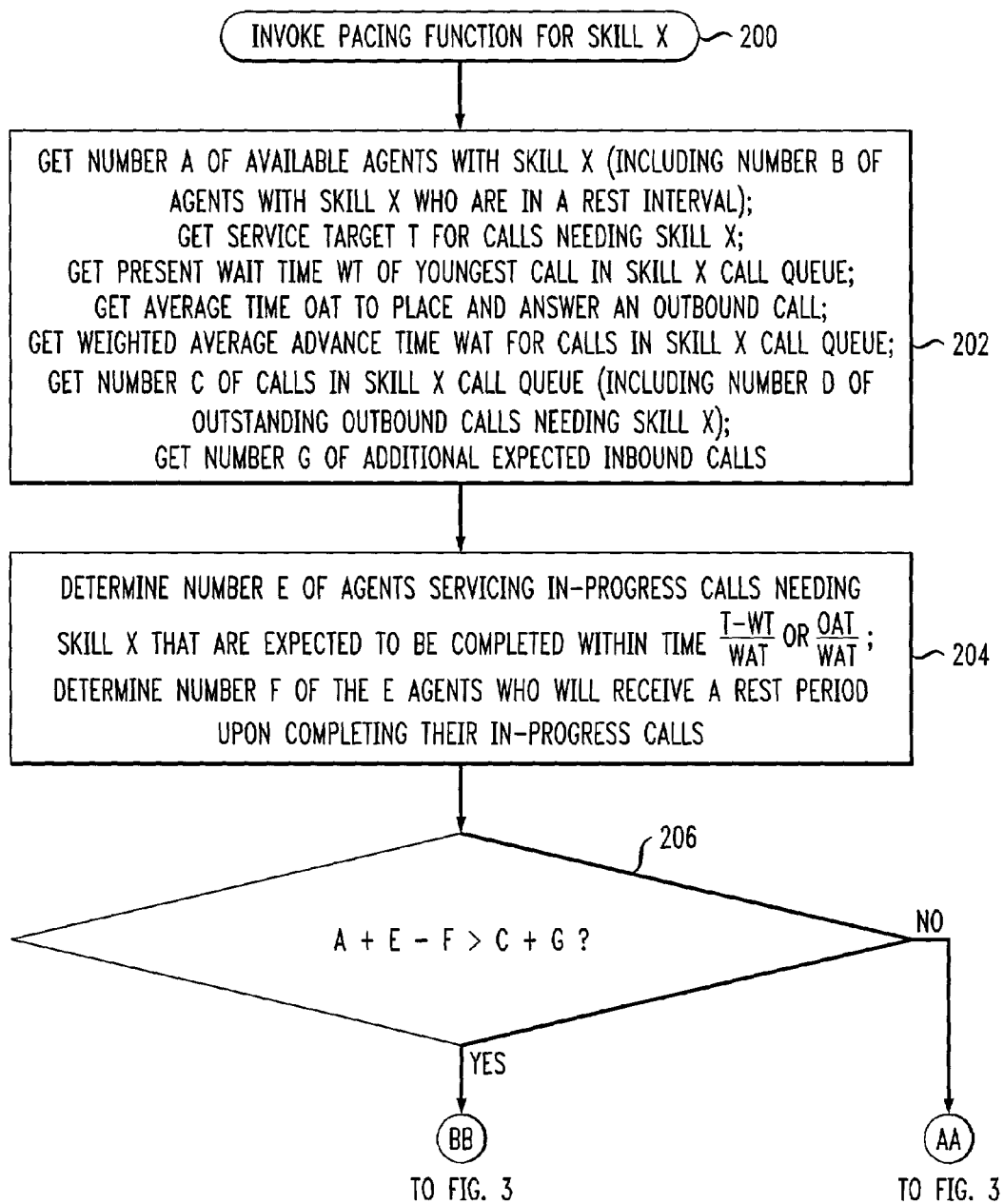
FIGS. 2 and 3 are a functional diagram of an outbound call pacing function of the call center of FIG. 1.
Figure 3:
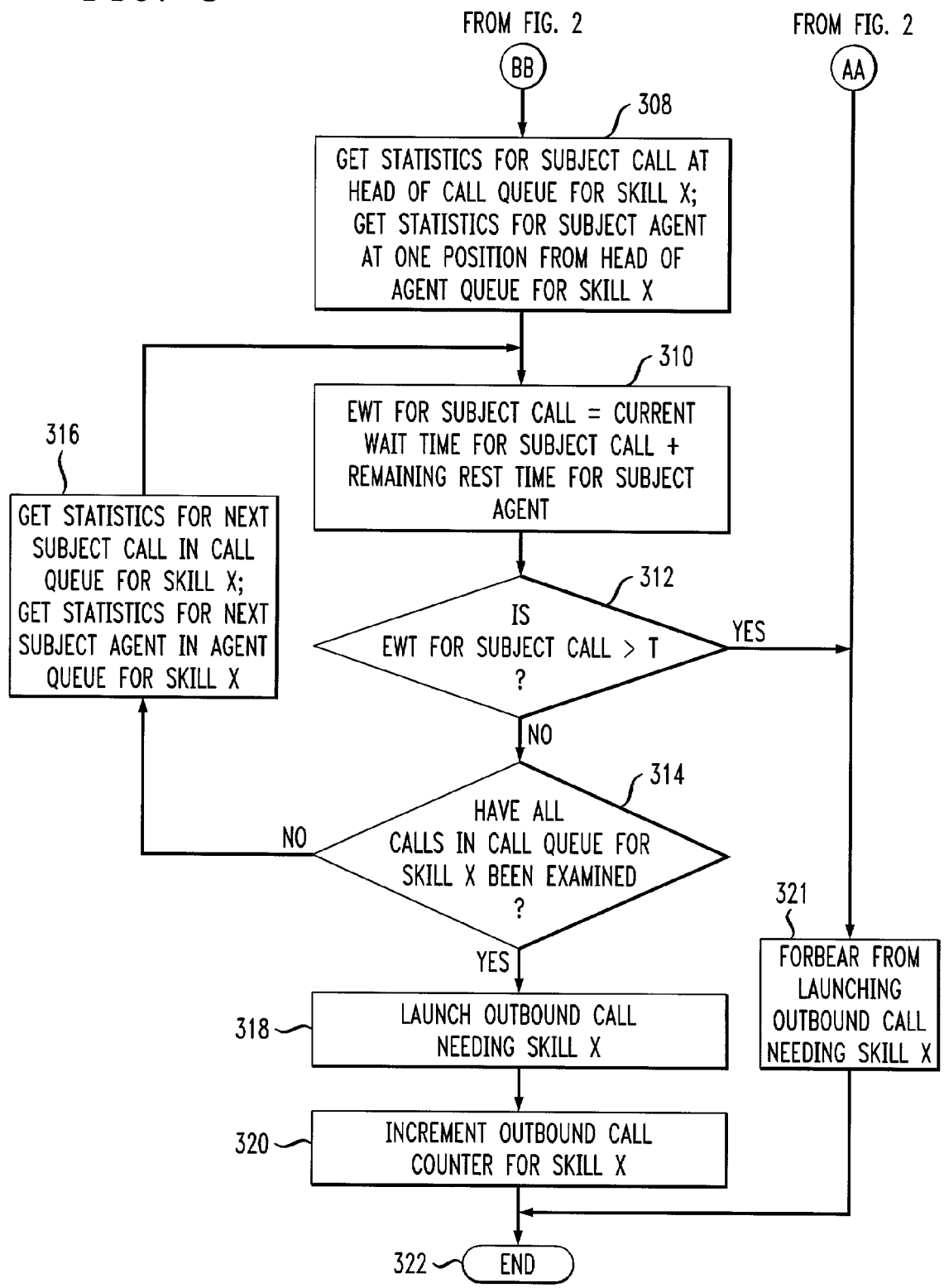

The operation of pacing function 122 is illustrated in FIGS. 2–3. Execution of pacing function 122 is illustratively invoked on a per-skill (alternatively and equivalently on a per-split) basis periodically by a timer timing out for that skill. Upon its invocation for a skill X, at step 200, pacing function 122 gathers and computes various data for skill X, at steps 202 and 204, and based on that data makes an agents-to-calls comparison, at step 206, to determine if the number of agents 156 with skill X exceeds the number of calls needing skill X and therefore may allow room for placing of an outbound call that needs skill X. Illustratively, pacing function 122 checks at step 206 whether at least the number A of presently-idle agents 156 with skill X exceeds the number C of presently-unserviced calls that need skill X. Preferably, pacing function 122 checks at step 206 whether the number A of presently-idle agents 156 with skill X plus the number E-F of additional idle agents with skill X expected at a future point in time exceeds the number C of presently-unserviced calls that need skill X plus the number G of additional inbound calls needing skill X that is expected at the future point in time. The number A of presently-idle agents 156 is the number of agents 156 in agent queue 182 of skill X. It includes the number of presently-available agents as well as the number B of agents 156 with skill X who are presently in a rest period (determined from event data for agents 162). The agents 156 who are presently in a rest period appear at the back of agent queue 182. The number C of presently-unserviced calls is the number of calls in call queue 180 for skill X. The number of calls in call queue 180 includes the number of presently-available inbound calls as well as the number D of outstanding outbound calls that need skill X (determined from the count of an outbound call counter for skill X that is included among data 184 of skill X). The outstanding outbound calls appear at the front of call queue 180. Alternatively, the outstanding outbound calls that need skill X do not appear in call queue 180 of skill X, in which case the number C of presently-unserviced calls includes the sum of the number of calls in call queue 180 and the number D of outstanding outbound calls.

Optionally, pacing function 122 supplements (adds to) the number A of agents with a number that corresponds to the service target T of skill X less the shortest present in-queue wait time WT of a call in call queue 180 for skill X (i.e., the WT of the youngest, or most-recently enqueued, call in call queue 180), divided by the weighted average advance time WAT of calls between adjacent positions of call queue 180 for skill X. The service target T is included among data 184 for skill X and is the goal of call center 100 for commencing servicing of calls that require skill X within that predetermined maximum amount of time T of their arrival at call center 100. The WAT is also included among data 184 for skill X and is illustratively determined as described in U.S. Pat. No. 5,506,898. Or, pacing function 122 optionally supplements the number A of agents with a number that corresponds to the average amount of time OAT that it takes to place and answer an outbound call, divided by the WAT for skill X. Or, pacing function 122 optionally supplements the number C of presently-unserviced calls with a number that corresponds to $$\frac{T-WT}{WAT} \text{ or } \frac{OAT}{WAT}.$$

This yields A+E−F>C+G, where A is the number of presently-idle agents, E−F is the number of additional idle agents expected at a future point in time, F is the number of agents who will receive a rest period after completing servicing their call, and G is the number of additional inbound calls expected at the future point in time. Typically, G=E. Alternatively, pacing function 122 optionally supplements the number A of agents with the number E of agents having skill X who are presently servicing in-progress calls and who are expected to become available within a time period equal to the number $$\frac{T-WT}{WAT} \text{ or } \frac{OAT}{WAT}$$

(determined at step 204 from predicted worktime remaining for calls-in-progress), less the number F of agents in number E who will receive a rest period after they have completed servicing their in-progress calls (determined at step 204 from rules for agent pacing 164). If the number of agents 156 does not exceed the number of calls as determined at step 206, there is no room for placing an outbound call needing skill X, and so execution of pacing function 122 ends for skill X, at block 322 of FIG. 3.

If the number of idle agents 156 exceeds the number of unserviced calls as determined at step 206, pacing function 122 determines whether launching an additional outbound call for skill X would impair a service target for skill X. If pending outbound calls are included in call queue 180, pacing function 122 gets stored statistics for the waiting call that is at the head of call queue 180 for skill X and for the available agent 156 who is in the queue position next to the head of agent queue 182 for skill X, at step 308. If pending outbound calls are not included in call queue 180, pacing function 122 gets stored statistics for the waiting call that is at the head of call queue 180 for skill X and for the available agent who is the number D of pending outbound calls away from the head of agent queue 182 for skill X, at step 308. Pacing function 122 then computes the expected wait time EWT for this call as the present in-queue wait time of this call (obtained from data 184 for skill X) plus the remaining rest time of this agent (determined from predicted skill occurrence 166), at step 310, and checks whether the computed EWT exceeds the service target T for skill X, at step 312. If the EWT exceeds the service target T, there is no room for placing an outbound call needing skill X, and so execution of pacing function 122 ends for skill X, at block 322.

If the EWT does not exceed the service target T, pacing function 122 checks whether it has performed steps 310 and 312 for all calls that are enqueued in call queue 180 of skill X, at step 314. If not, pacing function 122 gets stored statistics for the available agent 156 who is next from the head of agent queue 182 for skill X and the call that is next from the head of call queue 180 for skill X, at step 316, and returns to step 310 to perform steps 310 and 312 for this next agent and next call. If and when pacing function 122 has performed steps 310 and 312 for all waiting calls in call queue 180 of skill X without finding an EWT that exceeds the service target T for skill X, as determined at step 314, it means that there is room for an additional outbound call needing skill X. Pacing function 122 therefore causes dialer 114 to place an outbound call needing skill X, at step 318, increments the outbound call counter in data 184 of skill X, at step 320, and then ends its execution for skill X, at step 322.

Figure 4:
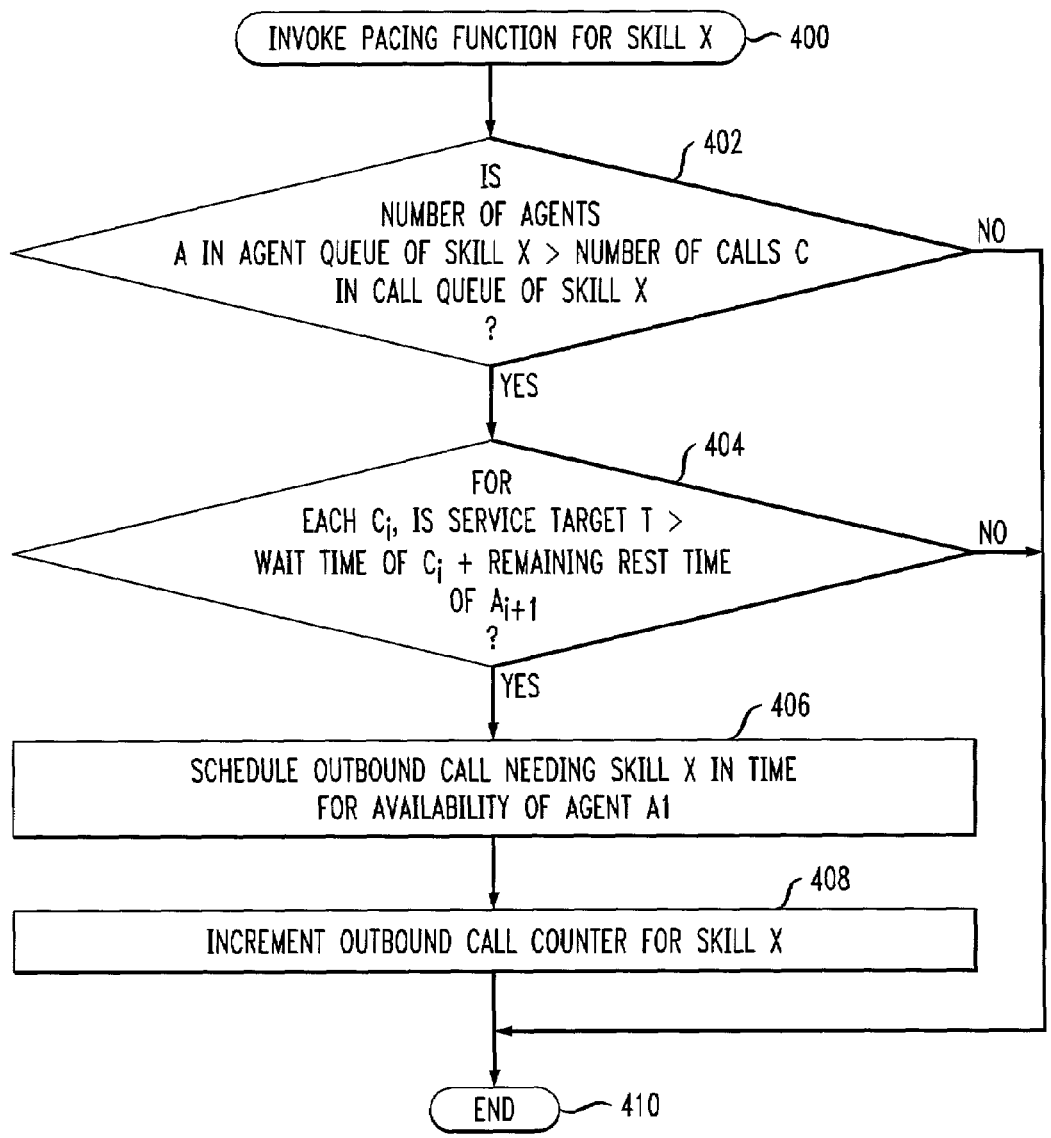
FIG. 4 is a functional diagram of the outbound call pacing function of the call center of FIG. 1 applied to an illustrative set of facts.

As an illustration, let us apply pacing function 122 to a particular simple set of facts: Skill X has a service target T of 40 seconds. There are two calls in call queue 180 of skill X; call C1 has waited in queue 180 for 18 seconds and call C2 has waited in queue 180 for 15 seconds. There are two agents 156 in agent queue 182 of skill X and both are in their rest intervals; agent A1 with 14 seconds remaining in its rest interval and agent A2 with 16 seconds remaining in its rest interval. Therefore, the EWT of call C1=18 secs+14 secs=32 secs, and the EWT of call C2=15 secs+16 secs=31 secs. Referring to FIG. 4, assume that execution of pacing function 122 is now invoked for skill X at step 400 to determine whether an outbound call needing skill X should be scheduled for the next available agent (agent A1). An outbound call C0 will be scheduled only if all calls in call queue 180 will still be serviced within the service target T of 40 seconds. The EWT of outbound call C0=0 secs+14 secs=14 secs., the new EWT of call C1=18 secs+16 secs =34 secs, and the new EWT of call C2 is uncertain because there is no agent 156 in agent queue 182 of skill X to handle call C2. Because there are not enough agents 156 in agent queue 182 of skill X to handle the calls in call queue of skill X plus an outbound call, as determined at step 402, pacing function 122 decides not to launch an outbound call at this point in time and ends its execution, at step 410.

Two seconds later, execution of pacing function 122 is again invoked for skill X at step 400, but by this time a third agent A3 has entered agent queue 182 of skill X with 16 seconds remaining in its rest period. Now the EWT of outbound call C0=0 secs+12 secs=12 secs, the EWT of call C1=20 secs+14 secs=34 secs, and the EWT of C2=17 secs+16 secs=33 secs. Since there are now enough agents 156 in agent queue 182 of skill X to handle the calls in call queue 180 of skill X plus an outbound call, as determined at step 402, and since it is now known that calls C1 and C2 will be serviced by agents A2 and A3 within the service target T, as determined at step 404, pacing function 122 decides to launch an outbound call C0 for agent A1, at step 406, and then ends its execution, at step 410. The outbound call is scheduled such that it is anticipated to be answered 12 seconds from now, when agent A1 becomes available. Should the call be answered in less time, the rest period of agent A1 may be interrupted (ended early) and the call can still be delivered for servicing to agent A1. Optionally, the outbound call can be launched for and/or delivered to any idle agent other than A1. Optionally, if the outbound call is not answered by the receiver in the expected time, the targeted agent may be allowed to serve an inbound call, and a different agent targeted to serve the outbound call.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
    determining whether a number of resources for processing tasks exceeds a number of the tasks;
    determining whether a target time exceeds an estimated wait time for one of the resources of each of the tasks plus an additional task;
    in response to determining both that the number of the resources exceeds the number of the tasks and that the target time exceeds the estimated wait time of each of the tasks plus the additional task, initiating the additional task; and
    in response to determining either that the number of the resources does not exceed the number of the tasks or that the target time does not exceed the estimated wait time for each of the tasks plus the additional task, forbearing from initiating the additional task.

2. The method of claim 1 wherein:
    the additional task takes priority over at least some of the tasks.

3. The method of claim 1 wherein:
    determining whether a number of resources for processing tasks exceeds a number of the tasks comprises
    determining whether a number of idle said resources exceeds a number of unprocessed said tasks.

4. The method of claim 1 wherein:
    determining whether a number of resources for processing tasks exceeds a number of the tasks comprises
    determining whether a number of idle said resources, plus a difference between the target time and a shortest present waiting time for a resource of any of said tasks that are available for processing divided by an average advance time of said available tasks between adjacent positions of a queue of said available tasks, exceeds a number of unprocessed said tasks.

5. The method of claim 1 wherein:
    determining whether a number of resources for processing tasks exceeds a number of the tasks comprises
    determining whether a number of idle said resources, plus an average amount of time that a newly-initiated task takes to become available for processing divided by an average advance time of available said tasks between adjacent positions of a queue of said available tasks, exceeds the number of unprocessed said tasks.

6. The method of claim 1 wherein:
    determining whether a number of resources for processing tasks exceeds a number of the tasks comprises
    determining whether a sum of (a) a number of idle said resources, (b) a difference between the target time and a shortest present waiting time for a resource of any of said tasks that are available for processing divided by an average advance time of said available tasks between adjacent positions of a queue of said available tasks, (c) an average amount of time that a newly-initiated task takes to become available for processing divided by the average advance time, and (d) a number of said resources that are busy processing tasks and that are expected to become available within a time period equal to a sum of (b) and (c), less a number of resources among (d) that will receive a rest period upon ceasing to be busy, exceeds the number of said unprocessed tasks.

7. The method of claims 1 wherein:
    determining whether a number of resources for processing tasks exceeds a number of the tasks comprises
    determining whether a number of idle agents for servicing calls exceeds a number of unserviced calls.

8. The method of claim 7 wherein:
    the number of idle agents comprises
        a number of available agents plus a number of resting agents; and
    the number of unserviced calls comprises
        a number of available inbound calls plus a number of outstanding outbound calls.

9. The method of claim 8 wherein:
    the outbound calls have priority over the inbound calls.

10. The method of claim 9 wherein:
    initiating the additional task comprises
        initiating an additional outbound call.

11. A method of determining whether or not to initiate an outbound call in a blended inbound/outbound call center, comprising:
    determining whether a first number, comprising a number of agents having a skill who are available for servicing calls plus a number of agents having the skill who are resting, exceeds a second number, comprising a number of inbound calls needing the skill that are available for servicing plus a number of outstanding outbound calls needing the skill;
    determining whether a target maximum amount of time for commencing to service each available inbound call needing the skill exceeds an estimated wait time for an agent having the skill of each of the available inbound calls needing the skill, wherein the pending outbound calls needing the skill and an additional outbound call needing the skill take precedence over the inbound calls needing the skill;
    in response to determining both that the first number exceeds the second number and that the target time exceeds the estimated wait time of each of the available inbound calls needing the skill, initiating the additional outbound call needing the skill; and
    in response to determining either that the first number does not exceed the second number or that the target time does not exceed the estimated wait time of each of the available inbound calls needing the skill, forbearing from initiating the additional outbound call needing the skill.

12. The method of claim 11 wherein:

determining whether a first number exceeds a second number comprises determining whether the first number, comprising (a) the number of the agents having the skill who are available for servicing calls plus (b) the number of the agents having the skill who are resting plus (c) a difference between the target time and a shortest present waiting time for an agent of any of the available inbound calls needing the skill divided by an average advance time of the available inbound calls needing the skill between adjacent positions of a queue of the available inbound calls needing the skill, exceeds the second number.

13. The method of claim 11 wherein:

determining whether a first number exceeds a second number comprises determining whether the first number, comprising (a) the number of the agents having the skill who are available for servicing calls plus (b) the number of the agents having the skill who are resting plus (c) an average amount of time that a newly-initiated outbound call needing the skill takes to become available for servicing by an agent divided by an average advance time of the available inbound calls needing the skill between adjacent positions of a queue of the available inbound calls needing the skill, exceeds the second number.

14. The method of claim 11 wherein:

determining whether a first number exceeds a second number comprises determining whether the first number, comprising (a) the number of the agents having the skill who are available for servicing calls plus (b) the number of the agents having the skill who are resting plus (c) a difference between the target time and a shortest present waiting time for an agent of any of the available inbound calls needing the skill divided by an average advance time of the available inbound calls needing the skill between adjacent positions of a queue of the available inbound calls needing the skill plus (d) an average amount of time that a newly-initiated outbound call needing the skill takes to become available for servicing by an agent divided by the average advance time plus (e) a number of agents having the skill who are busy but are expected to become available within a time period equal to the sum of (c) and (d) minus a number of agents among (e) that will receive a rest period upon ceasing to be busy, exceeds the second number.

15. An apparatus that effects the method of one of the claims 1–14.

16. A computer-readable medium containing instructions which, when executed in a computer, cause the computer to perform the method of one of the claims 1–14.

17. An apparatus comprising:

first means for determining whether a number of resources for processing tasks exceeds a number of the tasks;

second means for determining whether a target time exceeds an estimated wait time for one of the resources of each of the tasks plus an additional task; and means cooperative with the first and the second determining means and responsive to both a determination that the number of the resources exceeds the number of the tasks and a determination that the target time exceeds the estimated wait time of each of the tasks plus the additional task, for initiating the additional task, and further responsive to either a determination that the number of the resources does not exceed the number of the tasks or a determination that the target time does not exceed the estimated wait time for each of the tasks plus the additional task, for forbearing from initiating the additional task.

* * * * *